United States Patent [19]

Abe et al.

[11] Patent Number: 4,612,159

[45] Date of Patent: Sep. 16, 1986

[54] NUCLEAR FUEL ELEMENT AND PROCESS FOR FABRICATING THE SAME

[75] Inventors: Ryusuke Abe, Hitachi; Makoto Shimizu, Ibaraki; Yasuo Hirose, Hitachi, all of Japan

[73] Assignee: Hitachi, Ltd., Tokyo, Japan

[21] Appl. No.: 542,992

[22] Filed: Oct. 18, 1983

[30] Foreign Application Priority Data

Oct. 18, 1982 [JP] Japan ................................ 57-183458

[51] Int. Cl.[4] ................................................ G21C 1/04
[52] U.S. Cl. .................................... 376/351; 376/251;
376/256; 376/314; 376/456
[58] Field of Search ............... 376/451, 456, 251, 256, 376/314

[56] References Cited

U.S. PATENT DOCUMENTS 3,836,431  9/1974  Flipot ................................. 376/451
3,892,626  7/1975  Hirose ................................ 376/451
3,949,460  4/1976  Porta .................................. 29/428
4,010,069  3/1977  Jung ................................... 376/451

Primary Examiner—Donald P. Walsh
Attorney, Agent, or Firm—Antonelli, Terry & Wands

[57] ABSTRACT

A nuclear fuel element comprises plutonium-containing fuel pellets filled in a cladding with both end sealed with end plugs. One end plug has a filter at the inside and a passage communicating with the space in the cladding through the filter. The passage is sealed at the surface part of the end plug by welding. The filter and the passage in the end plug are utilized for withdrawing a gas in the cladding filled with the fuel pellets in a process for fabricating the nuclear fuel element. The filter traps nuclear fissionable materials in the cladding to prevent its leakage to the outside. After the withdrawal of the gas, a helium gas is filled in the cladding through the passage in the end plug. After completion of these operations, the passage in the end plug is sealed as mentioned above.

4 Claims, 5 Drawing Figures

NUCLEAR FUEL ELEMENT AND PROCESS FOR FABRICATING THE SAME

BACKGROUND OF THE INVENTION

This invention relates to a nuclear fuel element for use in light water moderated nuclear reactors, heavy water-moderated nuclear reactors, etc. and a process for fabricating the same, and particularly to a nuclear fuel element suitable for plutonium-containing nuclear fuel and a process for fabricating the same.

A nuclear fuel element for use in a light water-moderated nuclear reactor or a heavy water-moderated nuclear reactor comprises fuel pellets, a thermal insulator, a plenum spring, etc. filled in a cladding, both ends of the cladding being sealed with end plugs by welding. In such a fuel element is normally a helium atmosphere, and such a fuel element is fabricated by firstly welding a lower end plug to a cladding, filling a large number of fuel pellets and a thermal insulator in the cladding, then vacuum-degassing and drying the inside of the cladding in a temperature range of 300°–400° C. to remove moisture from the fuel pellets and the cladding, inserting a plenum spring into the cladding, and finally welding an upper end plug to the cladding in a helium atmosphere, thereby sealing the cladding.

Nuclear fuel elements with fuel pellets containing plutonium obtained by reprocessing fuel used in a light water-moderated nuclear reactor have been fabricated. Plutonium has a high hazardness, and a sufficient safety control is required for fabricating the nuclear fuel elements.

SUMMARY OF THE INVENTION

The object of the present invention is to provide a nuclear fuel element capable of preventing scattering of nuclear fissionable materials to the outside of the nuclear fuel element and a process for fabricating the same.

The present invention is characterized by welding end plugs having a filter to a cladding of a nuclear fuel element. According to the present invention, scattering of nuclear fissionable materials can be completely prevented in a plant for fabricating plutonium-containing fuel elements, and fabrication of nuclear fuel can be carried out by automation while preventing a radiation exposure.

PREFERRED EMBODIMENTS OF THE INVENTION

Figure 1:
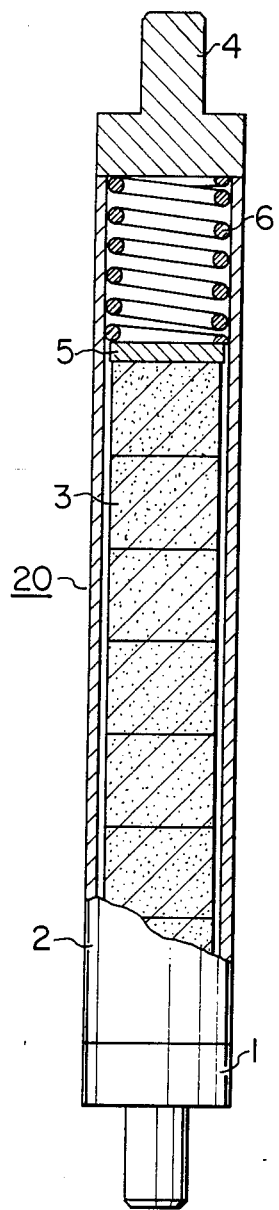
FIG. 1 is a vertical cross-sectional view of a conventional nuclear fuel element.

A fuel element for use in a light water-moderated nuclear reactor or a heavy water-moderated nuclear reactor comprises, as shown in FIG. 1, fuel pellets 3, a thermal insulator 5, a plenum spring 6, etc. filled in a cladding 2, both ends of the cladding 2 being sealed with end plugs 1 and 4 by welding.

Recently, development of plutonium-enriched fuel has been under way, where plutonium is extracted from a fuel used in a light water-moderated nuclear reactor, and the extracted plutonium is used again in nuclear fuel elements for a light water-moderated nuclear reactor. Plutonium-containing nuclear fuel elements can be, of course, used also in a heavy water-moderated nuclear reactor and also in a fast breeder reactor.

Fabrication of such plutonium-containing nuclear fuel elements still has technical problems to be solved.

The first problem is a high hazardness of plutonium and the consequent necessity for zero pollution control of a fabrication plant, different from uranium fuel.

The second problem is a strong radiation, different from uranium fuel, and the consequent necessity for remote control or automation of a fabrication plant.

Figure 2:
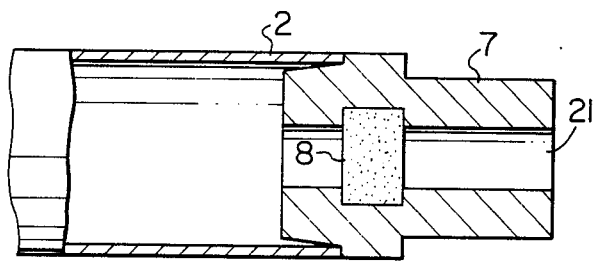
FIG. 2 is a schematic view showing a provisional end plug being fixed in a process for fabricating a conventional nuclear fuel element.

Various steps have been so far taken for solving the first problem in plants for fabricating nuclear fuel for heavy water-moderated nuclear reactors. That is, fuel pellets are not handled in the surrounding atmosphere, but are filled in a cladding 2 in a glove box, and after the filling, a provisional end plug 7 having a filter 8, shown in FIG. 2 is detachably inserted into the cladding 2 at one end. Plutonium particles have a minimum size of about 0.3 μm, and a high quality filter incapable of passing such minimum size is used for the filter 8.

The filter 8 can attain its effect in a degassing and drying step before a true end plug (not shown in the drawing) for sealing is welded to the cladding 2. The degassing and drying step is carried out by placing a fuel element with the provisional end plug into a chamber, and heating the fuel element to about 300° C. while evacuating the inside of the cladding 2 through a passage 21 in the provisional end plug 7 to remove the moisture from the inside of cladding. At the evacuation, plutonium particles are also withdrawn from the inside of the nuclear fuel element, but are trapped by the filter 8 in the provisional end plug 7 to prevent its scattering to the outside.

After the completion of vacuum-degassing and drying step an inert gas such as a helium gas is filled into the cladding. Then, the provisional end plug 7 is removed from the said end of cladding 2, and a plenum spring is inserted into the cladding 2. Then, a true end plug for sealing is welded to the cladding, whereby fabrication of nuclear fuel element is completed.

Nuclear fuel for the heavy water-moderated reactor has a low plutonium enrichment, for example, about 2%, and thus has a weak radiation. Thus, the foregoing operations are carried out substantially manually in a glove box. That is, it is only necessary for the nuclear fuel for the heavy water-moderated nuclear reactor to solve the said first problem.

On the other hand, plutonium-containing nuclear fuel element for a light water-moderated nuclear reactor has a high plutonium enrichment, for example, about 5%, and even a conventional type nuclear fuel element for the heavy water-moderated nuclear reactor has an increase in nuclear fission products in the nuclear fuel, and thus the intensity of radiation from such nuclear fuels is considerably higher than that of the nuclear fuel elements now available for the heavy water-moderated nuclear reactor.

Thus, the second problem, that is, remote control or automation, is necessary for plants handling such nuclear fuels. However, substantially all operations are carried out manually in the plants so far utilized for fabricating nuclear fuels for heavy water-moderated nuclear reactors, and thus the second problem has not been solved yet.

Above all, handling of a provisional end plug as a means for solving the first problem is a large obstacle to the automation, because these plutonium-enriched fuel and nuclear fuel for a heavy water-moderated nuclear reactor have a tendency to make an inside pressure of fuel element higher. In the case of a nuclear fuel for a pressurized light water-moderated nuclear reactor (PWR), the inside pressure of fuel element is, of couse, such a high pressure as 30 atmospheres. Use of a device for handling the provisional end plug in such a high pressure chamber brings about inconveniences such as a failure in pressure guarantee, a leakage of nuclear fissionable materials through sealed parts, an increase in evacuating time due to an increase in chamber capacity, difficult maintenance of the device from the outside of high pressure chamber, etc. In other words, a nuclear fuel element having end plugs that can serve to prevent nuclear pollution during the fabrication and can require no handling at all in a vacuum-degassing and drying oven and a pressure chamber is in demand.

As a result of extensive studies, the present inventors have succeeded in fabricating a nuclear fuel element that can solve the said first and second problems together.

A preferable embodiment of the present invention will be described below.

Figure 3:
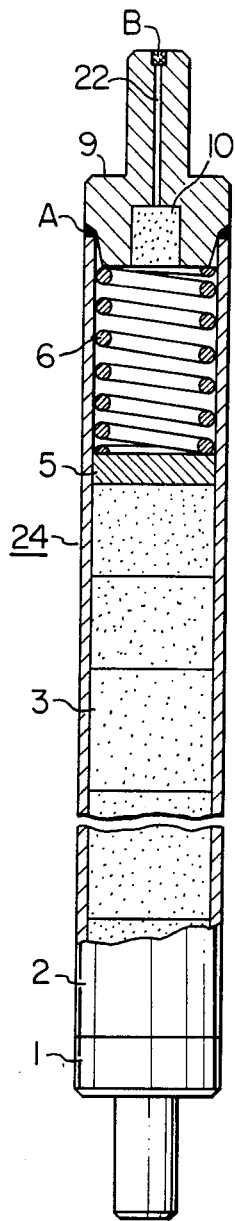
FIG. 3 is a vertical cross-sectional view of a nuclear fuel element according to one preferable embodiment of the present invention.

In FIG. 3, a nuclear fuel element 24 according to this embodiment is shown, where a lower end plug 1 is welded to one end, i.e. the lower end of a cladding 21, and an upper end plug 9 is welded to the other end. In the cladding 2, fuel pellets 3, a thermal insulator 5 and a plenum spring 6 are filled. The fuel pellets 3 contain uranium and plutonium. A filter 10 is provided in the upper end plug 9 and at a position in contact with the atmosphere in the cladding 2. A narrow, long recess 22 communicating with the space in the cladding 2 through the filter 10 is provided in the upper end plug 9. The narrow, long recess 22 is made by sealing a passage communicating with the outside at point B by welding. Welding position of the upper end plug 9 and the cladding 2 is at A.

How appropriate the structure is for fabricating a plutonium-containing fuel, particularly plutonium-enriched fuel, will be described below.

To fabricate such a nuclear fuel element, at first a lower end plug 1 is TIG welded to one end of a cladding 2 under an inert gas atmosphere such as a helium atmosphere under the normal pressure. This procedure is the same for the conventional type nuclear fuel element for a light water-moderated nuclear reactor and a heavy water-moderated nuclear reactor.

Then, plutonium-containing fuel pellets 3, a thermal insulator 5 and a plenum spring 6 are filled into the cladding 2 in a shielded box called a "glove box" to prevent nuclear pollution. Then, an upper end plug 9 having a filter 10 at the inside is welded to the cladding 2 in a chamber 13 in a helium gas atmosphere under the normal pressure, shown in FIG. 4. During the welding operation, the cladding 2 is supported by a gripper 11 and the upper end plug 9 by a gripper 12. Numeral 14 is a welder and numeral 15 is a sealing member. To make replacement with a helium gas atmosphere, the chamber inside is evacuated, and nuclear fissionable materials from the inside of the cladding 2 are trapped by the filter 10 in the upper end plug 9 to prevent nuclear pollution of the evacuating system. The filter 10 is made from a porous metal or ceramic and can trap nuclear fuel particles having a particle size down to about 0.3 $\mu$m.

Since the upper end plug 9 is welded to the cladding 2, there is no fear of disengagement. The space in the cladding 2 communicates with the outside only through a passage having the filter 10 in the upper end plug 9. Thus, a leakage of nuclear fissionable materials to the outside of cladding 2 can be prevented thereby, and there is no necessity for a special step for preventing nuclear pollution due to nuclear fuel in the successive fabrication steps. In other words, transfer between the successive fabrication steps can be carried out readily with safety.

After the welding of the upper end plug 9, the nuclear fuel element is vacuum-degassed and dried. That is, the nuclear fuel element is placed in a drying oven with an evacuating device. By driving the evacuating device, the inside of the drying oven is brought into a vacuum state, whereby the moisture is removed from the nuclear fuel element. The filter 10 in the upper end plug 9 serves to prevent nuclear pollution at the vacuum-degassing and drying like the evacuation at the welding. After the desired vacuumness has been reached, the drying oven is heated, and thus the moisture is further removed from the cladding 2.

Figure 5:
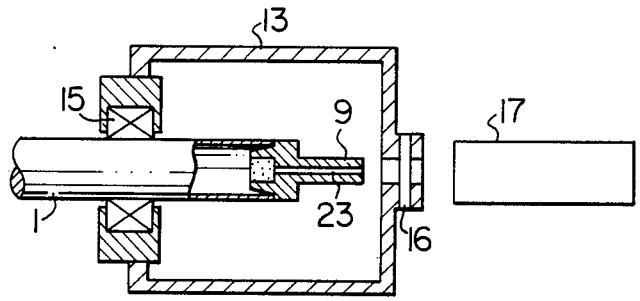
FIG. 5 is a schematic view showing welding of an upper end plug of the nuclear fuel element shown in FIG. 3.

After the vacuum-degassing and drying, the nuclear fuel element is subjected to sealing of the passage 23 in the upper end plug 9 in the manner shown in FIG. 5. That is, the head part of the nuclear fuel element is inserted into a welding chamber 13. Sealing of the chamber 13 from the outside is made by the sealing member 15. Then, the inside of the chamber 13 is evacuated, and then a pressurized helium is supplied into the chamber. The pressure of helium depends upon the kind of nuclear fuel, but is in a range of a few atmospheres to about 30 atmospheres. The helium supplied into the chamber 13 flows into the cladding 2 through the passage 23. Under such a high pressure, a laser beam from a laser welder 17 provided outside the chamber 13 is focused on the tip end of the passage 23 in the upper end plug 9 through a lens 16 to melt the tip end and seal the passage 23, whereby a narrow, long recess 22 shown in FIG. 3 is formed in the upper end plug 9.

Advantages in fabricating the nuclear fuel element 24 according to the present embodiment are as follows:

(1) After filling the fuel pellets 3, scattering of nuclear fissionable materials can be completely prevented in the successive fabrication steps, since the upper end plug having the filter 10 at the inside is welded to the cladding 2.

(2) Since the handling of a provisional end plug as in the conventional process is not required in the welding chamber, the additional mechanism can be omitted, and consequently a reliability of automation in fuel fabrication can be enhanced.

(3) The volume of a high pressure chamber can be reduced owing to the unnecessity for using a provisional end plug, and also the time of evacuating and pressurizing the chamber can be minimized. Furthermore, there are no sealed parts at all between the inside and the outside of the chamber, and thus the inside pressure of the chamber can be kept constant with ease.

(4) Peripheral welding of the upper end plug can be carried out under the normal pressure, and only sealing welding of the passage can be carried out under a high pressure. Thus, stable welding can be carried out.

Figure 4:
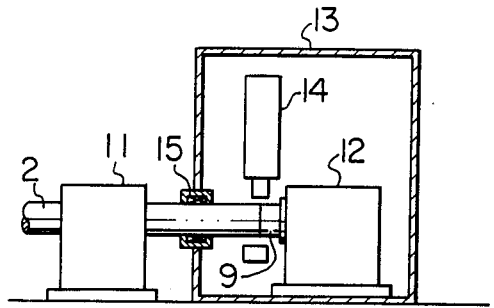
FIG. 4 is a schematic view showing welding of an upper end plug of nuclear fuel element.

Inconveniences of the conventional process for fabricating a nuclear fuel element for a heavy water-moderated nuclear reactor will be described below:

According to the conventional process, a provisional end plug 7 having a filter 8 of the same material as that of high quality filter (HEPA filter) is inserted into the cladding 2, as shown in FIG. 2 after the filling of fuel pellets 3. Then, the cladding is transferred in the surrounding atmosphere, and vacuum-degassed and dried. Then, the head part of the cladding is inserted into the welding chamber and sealed in the same manner as shown in FIG. 4.

The chamber 13 and the degassing and drying oven are connected to each other and are in a helium atmosphere under the normal pressure, where the provisional end plug 7 is manually removed from the cladding 2, and the plenum spring 6 is inserted into the cladding 2 and then the upper end plug 4 is inserted into the cladding 2. Then, the second end plug 4 is supported by an end plug gripper 12, and an arc gap is controlled by adjusting a TIG welding torch 14. After this operation, peripheral butt welding of the upper end plug 4 and the cladding 2 is carried out to complete the process.

Disadvantages of fabricating a pressurized type nuclear fuel element according to the said conventional process are described below:

(1) Mere insertion of the provisional end plug 7 into the cladding 2 after the filling of fuel pellets 3 cannot completely prevent scattering of nuclear fissionable materials.

(2) It is necessary to incorporate a device for removing a provisional end plug, an end plug gripper, a device for inserting a plenum spring, a torch, etc. into a high pressure chamber 13, and thus (i) an increase in pressurizing time due to an increase in the volume of the high pressure chamber 13 reduces a production capacity, (ii) an increase in sealed parts between the inside and the outside of the chamber makes it difficult to maintain the pressure in the chamber 13 exactly, and (iii) the structure of the chamber 13 that withstands 30 atmospheres makes it difficult to adjust or maintain the internal devices.

(3) In peripheral TIG welding of the upper end plug 4 under 30 atmospheres, no arc stability is obtained, making automation difficult to attain.

These disadvantages do not meet the two tasks in the fabrication of plutonium fuel, i.e. zero pollution control and plant automation, which however can be attained by the structure of nuclear fuel element and the process according to the said embodiment of the present invention.

We claim:

1. A process for fabricating a nuclear fuel element, which comprises welding an end plug to one end of a cladding, filling a plurality of fuel pellets containing plutonium into the cladding, fixing another end plug having a passage provided with a filter for trapping plutonium to another end of the cladding by welding, thereby communicating one end of the passage with the inside of the cladding and the other end with the outside, withdrawing a gas in the cladding through the passage in a state of the end plugs being fixed to both ends of the cladding, then filling an inert gas into the cladding through the passage, and sealing the passage communicating with the outside at a position exteriorly of the filter.

2. A process according to claim 1, wherein the filter is disposed proximate to an interior surface part of the another end plug and the sealing of the passage communicating with the outside is effected proximate to an exterior surface part of the another end plug.

3. A process according to claim 1, wherein the welding of the end plug and the another end plug to the ends of the cladding is effected by one type of welding and the sealing of the passage of another end plug communicating with the outside is effected by another type of welding.

4. A process according to claim 3, wherein the one type of welding is TIG welding and the another type of welding is laser beam welding.

* * * * *